(12) United States Patent
Komatsubara (10) Patent No.: US 10,881,080 B2
(45) Date of Patent: Jan. 5, 2021

(54) PET BED

(71) Applicant: Unicharm Corporation, Ehime (JP)

(72) Inventor: Daisuke Komatsubara, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 44 days.

(21) Appl. No.: 16/300,678

(22) PCT Filed: May 20, 2016

(86) PCT No.: PCT/JP2016/065094
§ 371 (c)(1),
(2) Date: Nov. 12, 2018

(87) PCT Pub. No.: WO2017/195383
PCT Pub. Date: Nov. 16, 2017

(65) Prior Publication Data
US 2019/0313600 A1 Oct. 17, 2019

(30) Foreign Application Priority Data
May 13, 2016 (JP) .................. 2016-097255

(51) Int. Cl.
*A01K 1/035* (2006.01)
(52) U.S. Cl.
CPC .................. *A01K 1/0353* (2013.01)
(58) Field of Classification Search
CPC ...... A01K 1/035; A01K 1/0353; A01K 1/015; A01K 1/0157; A01K 1/0107
See application file for complete search history.

(56) References Cited

U.S. PATENT DOCUMENTS 5,033,408 A * 7/1991 Langenbahn ........ A01K 1/0353
119/28.5
5,136,981 A 8/1992 Barreto et al.
5,311,837 A 5/1994 Mamer-Boellstorff
(Continued)

FOREIGN PATENT DOCUMENTS

CN 2733893 Y 10/2005
CN 204653296 U 9/2015
(Continued)

OTHER PUBLICATIONS

English Abstract and Machine Translation for German Publication No. 202004008487 U1, published Sep. 2, 2004, 5 pgs.
Extended European Search Report for European Patent Application No. 16901728.2, dated Apr. 1, 2019, 8 pgs.
English Abstract and Machine Translation for Japanese Publication No. 2005-198598 A, published Jul. 28, 2005, 24 pgs.
English Abstract and Machine Translation for Chinese Publication No. 2733893 Y, published Oct. 19, 2005, 5 pgs.
(Continued)

*Primary Examiner* — Thanh Pham
(74) *Attorney, Agent, or Firm* — Fredrikson & Byron, P.A.

(57) ABSTRACT

The purpose of the present invention is to provide a pet bed which is not soiled by liquids such as liquid excrement and cleaning solutions, and which can maintain excellent sanitary conditions. This pet bed (1) is provided with a bed main body (5) that includes: a frame (3) which has a prescribed thickness; and a mat (4) which is less thick than the frame (3) and is detachably fitted into the frame (3). The pet bed (1) is provided with an absorbent sheet (2) on the top surface of the mat (4), and, in an opened state, the area in plan view of the absorbent sheet (2) is greater than the area in plan view of the top surface of the mat (4).

8 Claims, 4 Drawing Sheets

(56) References Cited

U.S. PATENT DOCUMENTS

| | | | | |
|---|---|---|---|---|
| 5,630,377 | A | * | 5/1997 | Kumlin .............. A01K 1/0107 119/172 |
| 5,784,995 | A | | 7/1998 | Willinger |
| 6,173,675 | B1 | * | 1/2001 | Licciardo ............ A01K 1/0353 119/28.5 |
| 6,196,156 | B1 | * | 3/2001 | Denesuk ............ A01K 1/0152 119/28.5 |
| 2005/0166855 | A1 | | 8/2005 | Kaneko et al. |
| 2008/0178812 | A1 | * | 7/2008 | Dennis ............... A01K 1/0353 119/28.5 |
| 2009/0000557 | A1 | * | 1/2009 | Takahashi ........... A01K 1/0107 119/161 |
| 2014/0230735 | A1 | | 8/2014 | Coulter |
| 2014/0261219 | A1 | * | 9/2014 | Renforth ............ A01K 1/0254 119/482 |

FOREIGN PATENT DOCUMENTS

| | | |
|---|---|---|
| DE | 202004008487 U1 | 9/2004 |
| JP | 2005198598 A | 7/2005 |
| JP | 2006000102 A | 1/2006 |
| JP | 2006180793 A | 7/2006 |
| JP | 2009118791 A | 6/2009 |
| JP | 3191888 U | 7/2014 |

OTHER PUBLICATIONS

English Abstract and Machine Translation for Chinese Publication No. 204653296 U, published Sep. 23, 2015, 5 pgs.

English Abstract for Japanese Publication No. 2006-180793 A, published Jul. 13, 2006, 1 pg.

English Abstract for Japanese Publication No. 2009-118791 A, published Jun. 4, 2009, 1 pg.

English Abstract for Japanese Publication No. 2006-000102 A, published Jan. 5, 2006, 1 pg.

English Machine Translation for Japanese Publication No. 3191888 U, published Jul. 17, 2014, 14 pgs.

PCT International Search Report dated Jul. 12, 2016 for Intl. App. No. PCT/JP2016/065094, from which the instant application is based, 2 pgs.

Untranslated Decision to Grant a Patent mailed by Japan Patent Office (JPO) for Application No. 2016-097255, Aug. 3, 2018, 3 pages.

English machine translation of Decision to Grant a Patent mailed by Japan Patent Office (JPO) for Application No. 2016-097255, Aug. 9, 2018, 3 pages.

\* cited by examiner

PET BED

RELATED APPLICATIONS

This application is a 35 U.S.C. 371 national stage filing from international application No. PCT/JP2016/065094, filed May 20, 2016, which claims priority to Japanese Application No. 2016-097255, filed May 13, 2016, the teachings of which are incorporated herein by reference.

FIELD

The present invention relates to a pet bed to be used when keeping a pet such as a dog or cat.

BACKGROUND

Pet beds for napping pets such as dogs and cats are known which are provided with an annular frame body having a recess on the inside and a mat with a cushioning property fitted in the recess.

Examples of such pet beds include the pet bed disclosed in PTL 1, which has a ring-shaped frame member situated in the bottom part of a cover that forms a bag shape, and an opening for insertion and removal of the frame member disposed at the center location of the frame member, wherein the cover is folded inside so that the region from the outer peripheral surface to the inner peripheral surface of the frame member is covered by the cover, the remaining cover fabric including the opening being spread over the bottom part in the cover to construct a main bed body having a recess inside it, while a block body having essentially the same planar shape as the recess is fitted into the recess.

The pet bed disclosed in PTL 1 allows the cover to be removed and washed, and is therefore considered to be hygienic.

CITATION LIST

Patent Literature

[PTL 1] Japanese Unexamined Patent Publication No. 2006-180793

SUMMARY

Technical Problem

However, since the cover in the pet bed disclosed in PTL 1 is constructed of a fabric of synthetic fibers or the like, when a bedridden pet discharges liquid excreta such as urine onto the bed, or when the owner washes the pet with a washing fluid on the bed, the liquid of the liquid excreta or washing fluid permeates through the cover, often fouling the frame member or block body in the interior.

While an absorbent sheet for excreta treatment may be spread over the bed to avoid such fouling by liquids, simply spreading such an absorbent sheet over the bed causes the liquid to diffuse over the surface of the pet's body or the surface of the absorbent sheet, often resulting in leakage from the absorbent sheet (i.e., transmitted leakage occurs).

It is therefore an object of the present invention to provide a pet bed that can avoid fouling by liquids of liquid excreta or washing fluids and can maintain a satisfactory hygienic condition.

Solution to Problem

One aspect (aspect 1) of the invention is a pet bed provided with a bed body comprising a frame body having a prescribed thickness, and a mat having a smaller thickness than the thickness of the frame body and inserted in a freely detachable manner in the frame body, wherein the pet bed is provided with an absorbent sheet on the top surface of the mat, and the absorbent sheet has a planar area in the expanded state that is larger than the planar area of the top surface of the mat.

Since the pet bed of aspect 1 is provided with an absorbent sheet on the top surface of the mat, even when a bedridden pet discharges liquid excreta such as urine onto the bed or the owner washes the pet with a washing fluid on the bed, the liquid of the liquid excreta or washing fluid can be absorbed and retained in the absorbent sheet.

Furthermore, since the absorbent sheet in the pet bed of aspect 1 has a planar area in the expanded state that is larger than the planar area of the top surface of the mat, when the absorbent sheet is situated on the top surface of the mat of the bed body, the outer perimeter edges of the absorbent sheet rise toward the top side along the inner peripheral wall surfaces of the frame body, allowing formation of standing sections that function as anti-leakage walls against the aforementioned liquid. If such standing sections are formed, the liquid will be unlikely to leak from the absorbent sheet (i.e., transmitted leakage will be unlikely to occur) even when it has diffused through the surface of the pet's body or the surface of the absorbent sheet to the outer side in the in-plane direction of the absorbent sheet.

Therefore, the pet bed of this aspect can avoid fouling by liquids of liquid excreta or washing fluids and can maintain a satisfactory hygienic condition.

According to another aspect (aspect 2) of the invention, in the pet bed of aspect 1, the pet bed is provided with a liquid-permeable cushion material having a thickness of 5 mm or greater on the top surface of the absorbent sheet, and the cushion material is made of a fiber structure composed of thermoplastic resin continuous fibers having fiber diameters of 0.01 mm to 3 mm.

Since the liquid-permeable cushion material disposed on the top surface of the absorbent sheet in the pet bed of aspect 2 is made of a fiber structure composed of the specific continuous fibers, and the fiber structure is unlikely to bend due to the continuous fibers, or even if it is bent it is easily restored to its original form, the pet bed of this aspect having such a fiber structure disposed on the top surface of the absorbent sheet can easily maintain the form in which the absorbent sheet is situated (i.e., the absorbent sheet is less likely to bend or twist), and the function of the absorbent sheet can be exhibited in a stable manner. Thus, even when liquid diffuses on the surface of the pet's body or between the surface of the pet's body and the absorbent sheet, it is possible to more stably prevent leakage from the absorbent sheet.

According to yet another aspect (aspect 3) of the invention, in the pet bed of aspect 2, the fiber structure has a density of 0.01 g/cm$^3$ to 0.10 g/cm$^3$ and a thickness of 3 mm or greater when pressed by a pressure of 3.4 kPa.

Since the liquid-permeable cushion material disposed on the top surface of the absorbent sheet in the pet bed of aspect 3 is made of a fiber structure also having these specified physical properties, and functions as a spacer (space-holding member) between the pet's body and the absorbent sheet, liquid is less likely to diffuse on the surface of the pet's body or between the surface of the pet's body and the absorbent sheet, and the aforementioned transmitted leakage can be even more reliably prevented. This function and effect can be adequately exhibited because even if the cushion material collapses to some degree by body pressure of the pet (i.e., about 3.4 kPa), since the cushion material has the aforementioned specific structure (i.e., the structure according to aspect 2) and physical properties (i.e., the physical properties according to aspect 3), a minimum fixed distance can be ensured between the pet's body and the absorbent sheet, and a minimum fixed quantity of liquid fluid channels can be ensured.

According to yet another aspect (aspect 4) of the invention, in the pet bed of aspect 2 or 3, the cushion material has a planar area on the top surface of at least 90% and less than 100% of the planar area of the top surface of the mat.

Since the planar area on the top surface of the cushion material in the pet bed of aspect 4 is at least 90% and less than 100% of the planar area of the top surface of the mat, the standing sections of the absorbent sheet are inserted in the narrow gaps between the side surfaces of the cushion material and the inner peripheral wall surfaces of the frame body, helping to maintain the standing state of the standing sections. This allows the pet bed of this aspect to more reliably exhibit the function and effect exhibited by the standing sections of the absorbent sheet.

According to yet another aspect (aspect 5) of the invention, in the pet bed according to any of aspects 2 to 4, the fiber structure has the ends of the fibers composing the fiber structure present on the side surfaces that extend in the thickness direction, and the ends are engaged with the absorbent sheet.

Since the ends of the constituent fibers present on the side surfaces of the fiber structure in the pet bed of aspect 5 are engaged with the absorbent sheet, the standing sections of the absorbent sheet are held by the ends of the constituent fibers of the fiber structure, and the standing state of the standing sections is even more easily maintained. This allows the pet bed of this aspect to even more reliably exhibit the function and effect exhibited by the standing sections of the absorbent sheet.

According to yet another aspect (aspect 6) of the invention, in the pet bed according to any of aspects 2 to 5, the fiber structure has, in the thickness direction, a high-density layer that forms the top surface of the fiber structure and has relatively high density, and a low-density layer that is located on the bottom side of the high-density layer and has relatively low density.

In the pet bed of aspect 6, since the fiber structure forming the cushion material has, in the thickness direction, a high-density layer with relatively high density (apparent density) and a low-density layer with relatively low density, a fixed space can be ensured between the pet's body and the absorbent sheet by the high-density layer while a fixed cushioning property can be ensured by the low-density layer, that are in the cushion material.

Furthermore, since the high-density layer forming the top surface of the cushion material (fiber structure) has densely disposed constituent fibers that are unlikely to move, the interfiber distances between the constituent fibers on the top surface are unlikely to vary even if the pet moves on the top surface of the cushion material, and liquids of liquid excreta or washing fluid that have been supplied onto the top surface of the cushion material can be caused to stably migrate to the bottom side of the cushion material.

According to yet another aspect (aspect 7) of the invention, in the pet bed of any one of aspects 2 to 6, the absorbent sheet has extending sections that extend to the top surface of the cushion material.

In the pet bed of aspect 7, since the absorbent sheet has extending sections that extend to the top surface of the cushion material and the standing sections of the absorbent sheet are formed to a high height, it is possible to minimize not only the aforementioned transmitted leakage (i.e., transmitted leakage by diffusion on the surface of the pet's body or through the surface of the absorbent sheet), but also transmitted leakage by diffusion on the surface on the top side of the cushion material or through the constituent fibers. This allows the pet bed of this aspect to more reliably avoid fouling by liquids of liquid excreta or washing fluid.

According to yet another aspect (aspect 8) of the invention, in the pet bed according to any of aspects 2 to 7, the absorbent sheet is provided with a top sheet, a back sheet, and an absorbent body situated between the two sheets, and the absorbent body has a planar area that is smaller than the planar area on the top surface of the cushion material.

Since the absorbent body in the absorbent sheet of the pet bed of aspect 8 has a planar area that is smaller than the planar area on the top surface of the cushion material, the standing sections of the absorbent sheet are formed of a laminate of the top sheet and back sheet. Since the standing sections formed of the laminate do not include the absorbent body and are less likely to vary in thickness even upon absorption of liquid, the standing sections can maintain their standing state in the gaps between the side surfaces of the cushion material and the inner peripheral wall surfaces of the frame body even when the absorbent sheet has absorbed the liquid.

Particularly when the cushion material has the construction of aspect 5, the ends of the constituent fibers present on the side surfaces of the cushion material (fiber structure) easily reach to the back sheet through the top sheet at the standing sections of the absorbent sheet and the ends of the constituent fibers and the absorbent sheet can more firmly engage, thereby allowing the standing sections to more reliably maintain their standing state.

According to yet another aspect (aspect 9) of the invention, in the pet bed according to any of aspects 2 to 7, the absorbent sheet is provided with a top sheet, a back sheet, and an absorbent body situated between the two sheets, and the absorbent body has a planar area that is larger than the planar area on the top surface of the cushion material.

Since the absorbent body in the absorbent sheet of the pet bed of aspect 9 has a planar area that is larger than the planar area on the top surface of the cushion material, the standing sections of the absorbent sheet are formed of a laminate of the top sheet, the absorbent body and the back sheet. The standing sections formed of such a laminate can absorb liquids of liquid excreta or washing fluid, and therefore even when large amounts of liquid have diffused as described above, they can be absorbed by the standing sections and the aforementioned transmitted leakage can be even more reliably prevented.

Yet another aspect (aspect 10) of the invention is a method of using a pet bed body provided with a frame body having a prescribed thickness, and a mat having a smaller thickness than the thickness of the frame body and inserted in a freely detachable manner in the frame body, the method including placing an absorbent sheet having a planar area in the expanded state that is larger than the planar area of the top surface of the mat, on the top surface of the mat.

In the method of using a pet bed body according to aspect 10, an absorbent sheet is placed on the top surface of the mat of the bed body, and therefore even when a bedridden pet discharges liquid excreta such as urine onto the bed or the owner washes the pet with a washing fluid on the bed, during nursing, the liquid of the liquid excreta or washing fluid can be absorbed and retained in the absorbent sheet.

Furthermore, since the absorbent sheet used in the method of this aspect has a planar area in the expanded state that is larger than the planar area of the top surface of the mat, when the absorbent sheet is situated on the top surface of the mat of the bed body, the outer perimeter edges of the absorbent sheet rise toward the top side along the inner peripheral wall surfaces of the frame body, allowing formation of standing sections that function as anti-leakage walls against the aforementioned liquid. If such standing sections are formed, the liquid will be unlikely to leak from the absorbent sheet even when it has diffused through the surface of the pet's body or the surface of the absorbent sheet to the outer side in the in-plane direction of the absorbent sheet.

Consequently, in the method of using a pet bed body according to this aspect, even when a bedridden pet discharges liquid excreta such as urine onto the bed or the owner washes the pet with a washing fluid on the bed, during nursing, it is possible to avoid fouling of the bed body by liquid of the liquid excreta or washing fluid and to maintain a satisfactory hygienic condition, thereby helping to alleviate the effort needed for washing of the bed body by the owner.

Advantageous Effects of Invention

According to the pet bed of the invention, it is possible to avoid fouling by liquids of liquid excreta or washing fluids and to maintain a satisfactory hygienic condition.

DESCRIPTION OF EMBODIMENTS

Preferred embodiments of the pet bed of the invention will now be described in detail with reference to the accompanying drawings. Throughout the present description, unless otherwise specified, the concept of "viewing an object (for example, a pet bed, bed body or cushion material) on the horizontal plane in the same form as when it is used, in the thickness direction of the object from the top side in the vertical direction" will be referred to as "the planar view", and especially when the object is a sheet-like member such as an absorbent sheet, the concept of "viewing an object on the horizontal plane in the expanded state in the thickness direction of the object from the top side in the vertical direction" will be referred to as "the planar view". A "plan view" refers to a drawing as seen in the planar view.

The directions used in the present description are as follows, unless otherwise specified. Throughout the present description, "lengthwise direction" refers to the "long direction of the lengths of a longitudinal object in the planar view", "widthwise direction" refers to the "short direction of the lengths of a longitudinal object in the planar view", and "thickness direction" refers to the "vertical direction of an object situated on the horizontal plane", with the lengthwise direction, widthwise direction and thickness direction being in a mutually perpendicular relationship.

Also throughout the present description, the "relatively proximal side with respect to the center of an object (for example, a pet bed, bed body, cushion material or absorbent sheet) (for example, the intersection between the widthwise center axis line running in the lengthwise direction and the lengthwise center axis line running in the widthwise direction)" will be referred to as the "inner side", and likewise the "relatively distal side with respect to the center of an object (for example, a pet bed, bed body, cushion material or absorbent sheet) (for example, the intersection between the widthwise center axis line running in the lengthwise direction and the lengthwise center axis line running in the widthwise direction)" will be referred to as the "outer side". Incidentally, unless otherwise specified, the term "height" used throughout the present description means the distance from the horizontal plane as the reference plane, for an object (for example, a pet bed) situated on the horizontal plane, to the apex of the object, in the vertical direction.

Moreover, unless otherwise specified, for the thickness direction of a pet bed, the "relatively distal side with respect to the mounting surface, when the pet bed is set on the mounting surface in the same form as when it is used" will be referred to herein as the "top side", and the "relatively proximal side with respect to the mounting surface when the pet bed is set on the mounting surface in the same form as when it is used" will be referred to as the "bottom side".

Figure 1:
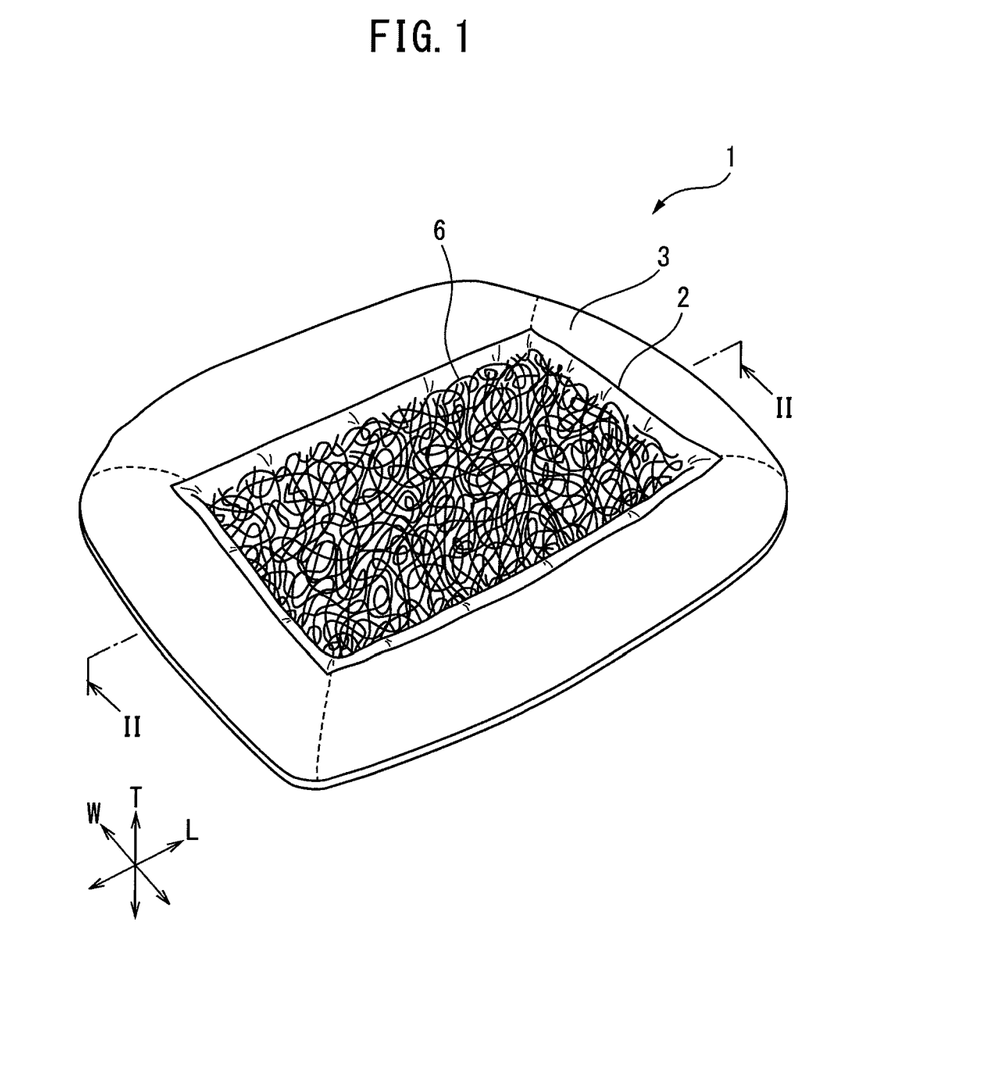
FIG. 1 is a perspective view of a pet bed according to an embodiment of the invention.
Figure 2:
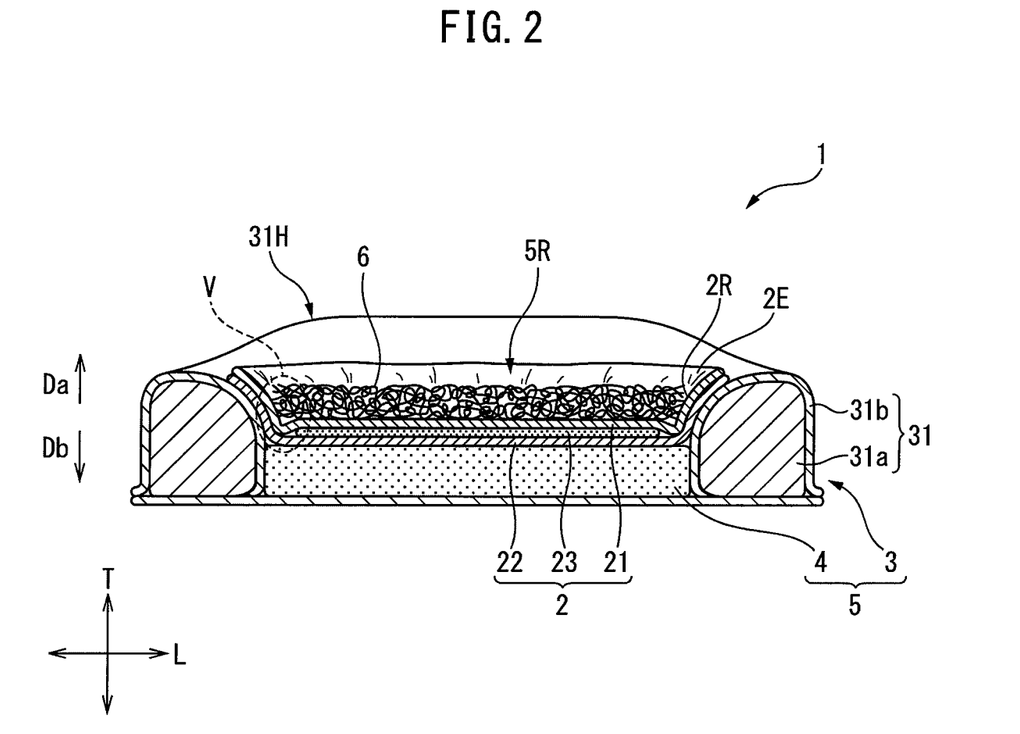
FIG. 2 is a cross-sectional view of a pet bed according to an embodiment of the invention, along line II-II of FIG. 1.
Figure 3:
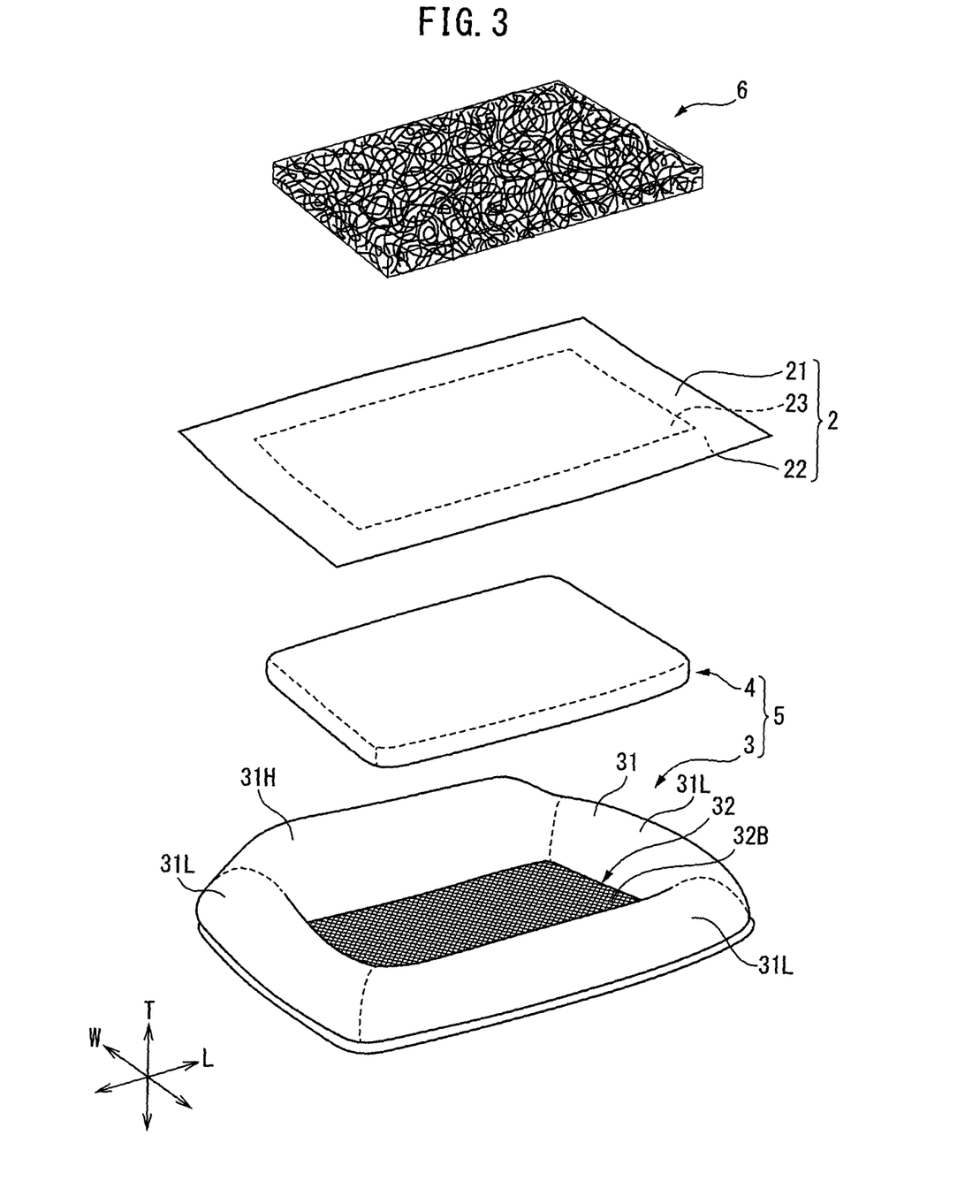
FIG. 3 is an exploded perspective view of a pet bed according to an embodiment of the invention.
Figure 4:
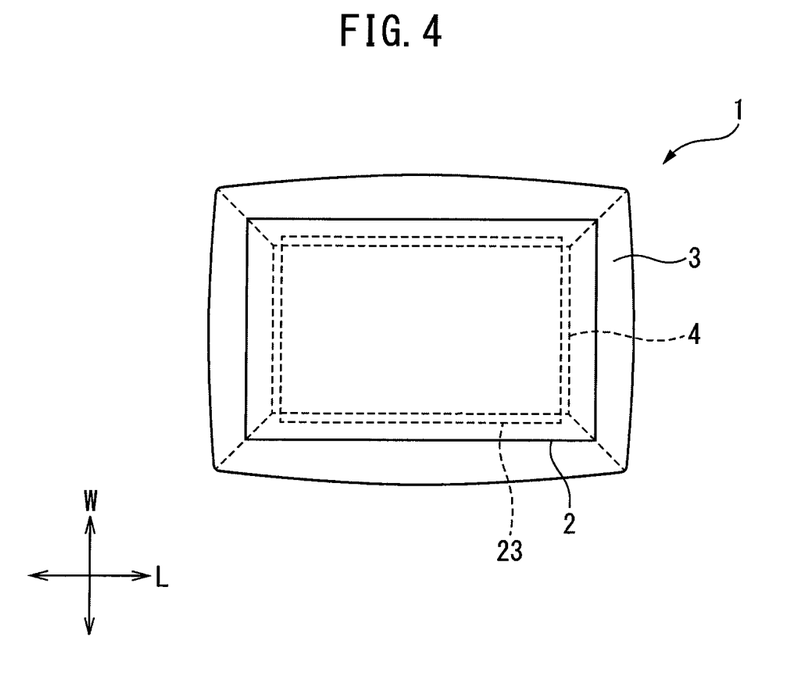
FIG. 4 is a plan view of the state of a pet bed according to an embodiment of the invention without the cushion material.

FIG. 1 is a perspective view of a pet bed 1 according to an embodiment of the invention, FIG. 2 is a cross-sectional view of the pet bed 1 along line II-II in FIG. 1, and FIG. 3 is an exploded perspective view of the pet bed 1. FIG. 4 is a plan view of the state of the pet bed 1 without a cushion material 6.

As shown in FIG. 1 and FIG. 3, the pet bed 1 according to the embodiment of the invention has a rounded longitudinal, essentially rectangular outer shape with a lengthwise direction L and a widthwise direction W, in the planar view. According to the invention, the planar shape of the pet bed is not limited to this embodiment, and any desired shape (such as circular, elliptical, square, triangular or star-shaped) may be employed, depending on the size of the pet and the desired design property. The outer dimensions of the pet bed may also be appropriately selected depending on the size and type of pet that will use the bed, and if the pet is a small or medium-sized dog, the length in the lengthwise direction L (the distance between the outer surfaces of the frame of the frame body in the lengthwise direction L) is about 400 mm to 1400 mm and the length in the widthwise direction W (the distance between the outer surfaces of the frame of the frame body in the widthwise direction W) is about 250 mm to 1200 mm.

As shown in FIGS. 1 to 3, the pet bed 1 of this embodiment of the invention is constructed of a bed body 5 that includes a rim-like frame body 3 with an essentially rectangular shape of a prescribed thickness and an essentially rectangular solid mat 4 having a smaller thickness than the thickness of the frame body 3, an absorbent sheet 2 with an essentially rectangular shape, situated on the surface of the top side Da (top surface) of the mat 4, and a cushion material 6 made of an essentially rectangular solid fiber structure with a cushioning property, situated on the top surface of the absorbent sheet 2.

As shown in FIG. 1 and FIG. 2, the pet bed 1 is also constructed with the perimeter portion of the bed body 5 rising to the top side Da by the frame body 3 which has a prescribed thickness (i.e., the height of the perimeter portion is higher), and the center section surrounded by the perimeter portion (frame body 3) as a recess 5R depressed toward the bottom side Db. In other words, as shown in FIG. 1 and FIG. 2, the recess 5R is constructed by a perimeter wall consisting of the inner sides (the inner peripheral wall surfaces) of the frame of the frame body 3 and a bottom part consisting of the top surface of the cushion material 6, and it is designed so that at the bottom part of the recess 5R, body pressure of the pet can be diffused while supporting the pet's body. The pet can therefore lie down in the recess 5R as a sleeping area, resting in the recess 5R.

Incidentally, as explained below, the cushion material 6 is not an essential constituent element of the pet bed of the invention, and if the pet bed does not comprise such a cushion material then the top surface of the absorbent sheet forms the bottom part of the recess. Even in such a case, the mat with a prescribed cushioning property which is disposed on the bottom side of the bottom part of the recess (i.e., the bottom side of the absorbent sheet) allows the pet's body to be supported while diffusing body pressure of the pet, at the bottom part of the recess.

Since the pet bed 1 of this embodiment comprises the absorbent sheet 2 on the top surface of the mat 4 of the bed body 5 (i.e., the bottom side Db of the bottom part of the recess 5R), even when the pet (especially a bedridden pet in need of nursing) discharges liquid excreta such as urine in the recess 5R or the owner washes the pet with a washing fluid in the recess 5R, the liquid of the liquid excreta or washing fluid can be absorbed and retained in the absorbent sheet 2 that has been disposed in the bottom side Db of the bottom part of the recess 5R (specifically, the bottom side Db of the cushion material 6).

Furthermore, for this embodiment, the absorbent sheet 2 has outer dimensions such that the planar area in the expanded state is larger than the planar area of the top surface of the mat 4.

If the absorbent sheet 2 has such outer dimensions, then when the absorbent sheet 2 is situated on the top surface of the mat 4 of the bed body 5, the outer perimeter edges of the absorbent sheet 2 will rise toward the top side Da along the inner peripheral wall surfaces of the frame body 3, as shown in FIG. 1, FIG. 2 and FIG. 4, so as to form standing sections 2R that function as anti-leakage walls against the above liquid. If such standing sections 2R are formed, the liquid will be unlikely to leak from the absorbent sheet 2 (i.e., transmitted leakage will be unlikely to occur) even when it has diffused over the surface of the pet's body or through the surface of the absorbent sheet 2 to the outer side in the in-plane direction of the absorbent sheet 2.

Therefore, the pet bed 1 of this embodiment can avoid fouling by liquids of liquid excreta or washing fluids and can maintain a satisfactory hygienic condition.

Throughout the present description, "planar area" means the area of the outer shape of an object (for example, an absorbent sheet, mat or cushion material) in the planar view. For this embodiment, therefore, the planar area of the absorbent sheet 2 in the expanded state is the rectangular area of the outer shape of the top surface of the absorbent sheet 2, and the planar area of the top surface of the mat 4 means the area of the rectangular outer shape of the top surface of the mat 4.

The pet bed of the invention is used with the recess of the bed body facing upward, as shown in FIG. 1, at a prescribed location in the pet's living space (for example, indoors), allowing the pet to lie down in the recess for resting. Incidentally, the pet bed of the invention may be set directly on the floor surface or ground of the pet's living space, or it may be set via a prescribed holder, mat or the like.

The pet that is to use the pet bed of the invention is not particularly restricted so long as it is an animal that can be kept as a pet, and it may be used for various animals such as dogs, cats or rabbits.

Each of the members of the pet bed of the invention will now be explained in detail using the pet bed 1 according to the first embodiment described above.

[Bed Body]

In the pet bed 1 of this embodiment, as shown in FIG. 2 and FIG. 3, the bed body 5 is constructed of a rim-like frame body 3 having a prescribed thickness and an essentially rectangular planar shape, and an essentially rectangular solid mat 4 having a smaller thickness than the thickness of the frame body 3, and inserted in a freely detachable manner on the inner side of the frame body 3.

As shown in FIG. 2 and FIG. 3, the perimeter portion of the bed body 5 rises further toward the top side Da than the center section where the mat 4 is located, due to the frame body 3 which has a prescribed thickness, and a housing recess is formed for housing of the absorbent sheet 2 and cushion material 6, by the inner peripheral wall surfaces of the perimeter portion that is raised toward the top side Da (i.e., the inner side surfaces of the frame of the frame body 3) and the top surface of the mat 4 surrounded by the inner peripheral wall surfaces.

Since the housing recess is formed by the mat 4 having a bottom part with a prescribed cushioning property, the construction is such that it is possible to support the pet's body while diffusing body pressure of the pet even if the pet bed does not comprise the aforementioned cushion material.

[Frame Body]

In the pet bed 1 of this embodiment, as shown in FIG. 3, the frame body 3 forming part of the bed body 5 is constructed of a frame body portion 31 having a prescribed thickness and having a rim-like structure along each of the sides of an essentially rectangular shape in the planar view, and a frame body recess 32 for housing of the mat 4, comprising a bottom part 32B located on the bottom side Db in the thickness direction T on the inner side of the frame of the frame body portion 31.

According to this embodiment, as shown in FIGS. 1 to 3, the frame body portion 31 forming the perimeter portion of the bed body 5 has a rim-like planar shape along each side of the essentially rectangular shape; however, as shown in FIG. 3, one of the four sides forming the frame body portion 31 is formed as a frame body high part 31H rising further toward the top side than the other three sides (i.e., it has a relatively higher height than the other three sides), and can function as a back support for the pet that is lying down in the recess 5R of the pet bed 1. On the other hand, as shown in FIG. 3, three of the four sides forming the frame body portion 31 are formed as frame body low parts 31L with relatively lower heights than the aforementioned frame body high part 31H, facilitating entry and exit of the pet into the recess 5R of the pet bed 1, while also functioning as a pillow that allows resting of the head of the pet lying down in the recess 5R.

Incidentally, according to the invention, the structure of the frame body portion is not limited to that of the embodiment described above, and the frame body portion may be formed as a frame body high part with two of the four sides having higher heights, or all of the four sides may have the same heights. Moreover, when the planar shape of the frame body portion is circular, part of the circular perimeter portion may be formed as the frame body high part with a higher height.

Moreover, for this embodiment, as shown in FIG. 2, the frame body portion 31 is constructed of a core material 31a forming the basic backbone of the frame body portion 31, and a sheet-like covering material 31b covering the core material 31a.

The member forming the core material 31a is not particularly restricted, and any member that is publicly known in the field may be employed; however, it is preferred to use one having a prescribed cushioning property and air permeability, such as cotton or urethane foam, or foam beads.

The sheet forming the covering material 31b is also not particularly restricted, and for example, a fabric (such as a woven fabric or knitted fabric) made of synthetic fibers or natural fibers may be used; however, the sheet preferably has a stretchable property from the viewpoint of ability to follow shape deformation of the core material 31a.

Also for this embodiment, as shown in FIG. 2 and FIG. 3, the frame body recess 32 is constructed of the inner side surfaces of the frame of the frame body portion 31 (the inner peripheral wall surfaces), and the bottom part 32B located on the bottom side Db in the thickness direction T on the inner side of the frame of the frame body portion 31. The bottom part 32B is formed of a mesh fabric (for example, a woven fabric or knitted fabric composed of synthetic fibers) that is continuous from the surface of the bottom side Db (bottom surface) of the frame body portion 31, ensuring air permeability so that air is not impeded by the mat 4 inserted in the frame body recess 32. The mesh fabric is attached across the entire bottom surface of the frame body portion 31.

According to the invention, the frame body recess is not limited to this embodiment and may instead be formed as an opening without a bottom part such as a fabric.

According to the invention, incidentally, the planar shape of the frame body (i.e., the inner shape of the frame and the outer shape of the frame of the frame body portion, in the planar view) is not particularly restricted, and any desired shape (such as circular, elliptical, square, triangular or star-shaped) may be employed, depending on the size of the pet and the desired design property. The outer dimensions of the frame body (the lengths in each direction and the thickness) are also not particularly restricted, and any desired outer dimensions may be employed according to the size and type of pet that is to use it.

[Mat]

In the pet bed 1 of this embodiment, as shown in FIG. 2 and FIG. 3, the mat 4 forming part of the bed body 5 is constructed of an essentially rectangular solid cushioning member having a planar shape and dimensions allowing it to be inserted in a freely detachable manner inside the frame of the frame body 3, and having a smaller thickness than the thickness of the frame body 3. The mat 4 is disposed at a location on the bottom side corresponding to the recess 5R, which is the sleeping area of the pet bed 1, and together with the cushion material 6, it allows the pet's body to be supported while diffusing the body pressure of the pet that is lying in the recess 5R.

Incidentally, when the frame body does not have a constant thickness as with the embodiment described above, the thickness of the frame body is the thickness of the portion having the smallest thickness (the thickness of the frame body low part 31L, in the case of this embodiment). For measurement of thickness, the object to be measured (the mat, frame body or cushion material) is placed on a horizontal plane and the height (the distance from the horizontal plane to the top surface of the object to be measured) is measured at 4 arbitrary locations, recording the average value.

The cushioning member forming the mat 4 is not particularly restricted so long as it has physical properties (for example, a cushioning property, softness, strength and air permeability) allowing the cushioning member to function as the sleeping area of the pet bed, and for example, cotton or urethane foam, foam beads or a web-like fiber structure made of a thermoplastic resin may be used. Among these, from the viewpoint of having an excellent cushioning property with high resilience, and excellent performance in terms of air permeability, water permeability and durability, the cushioning member preferably employs a web-like fiber structure made of thermoplastic resin continuous fibers. Such a web-like fiber structure is a structure in which thermoplastic resin continuous fibers form a plurality of loops while being entangled in a disordered manner and joined together by heat fusion. Such a fiber structure therefore has the ends of the continuous fibers (constituent fibers) on the side surfaces extending in the thickness direction of the fiber structure, while the ends of the constituent fibers are essentially absent inside the fiber structure. The thermoplastic resin forming such continuous fibers may be a polyester-based resin, polyamide-based resin, polyether-based resin or polyolefin-based resin, for example.

For the fiber structure it is also suitable to use a fiber structure with a two-layer structure having, in the thickness direction, a low-density layer that has a relatively low density (apparent density) and a high-density layer that has a relatively high density. Such a fiber structure with a two-layer structure can exhibit cushioning performance with high resilience when used as a mat with the low-density layer as the top side.

The density (apparent density) of the fiber structure can be measured in the same manner as for the fiber structure forming the cushion material 6 described below.

The cushioning member may be covered by a covering material such as a fabric (woven fabric or knitted fabric) made of synthetic fibers or natural fibers; however, the covering material preferably has a stretchable property from the viewpoint of ability to follow shape deformation of the cushioning member.

According to the invention, the shape and outer dimensions of the mat are not particularly restricted and any shape and outer dimension may be employed, so long as it has a shape and outer dimensions allowing it to be inserted in a freely detachable manner inside the frame of the frame body, and has a smaller thickness than the thickness of the frame body.

[Cushion Material]

In the pet bed 1 of this embodiment, as shown in FIG. 2 and FIG. 3, the liquid-permeable cushion material 6 is constructed of an essentially rectangular solid fiber structure having a planar shape and dimensions allowing it to be situated inside the frame of the frame body 3. The cushion material 6 is disposed further on the top surface of the absorbent sheet 2 described below, which is disposed on the top surface of the mat 4, and it forms the bottom part of the recess 5R which is the sleeping area of the pet bed 1, allowing the pet's body to be supported while diffusing the body pressure of the pet that is lying in the recess 5R.

The fiber structure forming the cushion material 6 is not particularly restricted so long as it has liquid permeability and a physical property allowing it to function as the sleeping area of the pet bed (for example, a cushioning property, softness, strength and air permeability); however, from the viewpoint of cushioning performance with excellent high resilience, as well as excellent performance in terms of liquid permeability, shape retention, air permeability and durability, the fiber structure is preferably a web-like fiber structure made of thermoplastic resin fibers similar to the cushioning member forming the mat 4, it is more preferably a fiber structure comprising a specific structure composed of thermoplastic resin continuous fibers with fiber diameters of 0.01 mm to 3 mm and having a thickness of 5 mm or greater, and it is most preferably a fiber structure also having, in addition to the specific structure described above, specific physical properties of a density of 0.01 g/cm$^3$ to 0.10 g/cm$^3$ and a thickness of 3 mm or greater when pressed under a pressure of 3.4 kPa (35 gf/km$^2$).

If the fiber structure forming the cushion material comprises such a specific structure, the fiber structure will be less likely to bend due to the continuous fibers, or even if it is bent it will be easily restored to its original form, and therefore when such a fiber structure is disposed on the top surface of the absorbent sheet, the form in which the absorbent sheet is situated will be easily maintained (i.e., the absorbent sheet will be less likely to bend or twist), and the function of the absorbent sheet can be exhibited in a stable manner.

Moreover, if the fiber structure additionally has the aforementioned specific physical properties, then the cushion material will function as a spacer (space-holding member) between the pet's body and the absorbent sheet, and therefore liquids of liquid excreta or washing fluid will be less likely to diffuse on the surface of the pet's body or between the surface of the pet's body and the absorbent sheet, and the aforementioned transmitted leakage can be more reliably prevented. This function and effect can be adequately exhibited because even if the cushion material collapses to some degree by body pressure of a pet such as a dog (i.e., about 3.4 kPa), since the cushion material has the aforementioned specific structure and physical properties, a minimum fixed distance can be ensured between the pet's body and the absorbent sheet, and a minimum fixed quantity of liquid fluid channels can be ensured.

Measurement of the fiber diameters of the fibers composing the fiber structure may be carried out in the following manner. First, fibers of prescribed lengths (for example, 5 mm) are cut out from 10 arbitrary locations of the fiber structure to be measured, and the ends of the cut out fibers are cut perpendicular to the direction in which the fibers extend. The cut surface is photographed at a prescribed magnification, and the fiber diameters (mm) of the fibers are measured from the obtained cross-sectional photograph. Incidentally, the value for the fiber diameter is the average value of the fiber diameters of the 10 cut out fibers.

Also, the density (apparent density) of the fiber structure may be measured in the following manner. First, a sample with a size of 15 cm×15 cm is cut out from the fiber structure to be measured without altering the thickness, and the sample mass (g) is measured. Next, the thickness (cm) of the cut out sample is measured in the same manner as for measurement of the thickness of the mat, and the sample volume (cm$^3$) is calculated. Finally, by dividing the sample mass by the volume, it is possible to obtain a value for the density (apparent density) (g/cm$^3$).

The thickness of the fiber structure when pressed at a pressure of 3.4 kPa (35 gf/cm$^2$) may be measured in the following manner. First, a pressure plate having a prescribed area (for example, a circular pressure plate with an area of 100πcm$^2$) is pressed against the fiber structure to be measured, at a pressure of 3.4 kPa. The thickness (mm) of the fiber structure in the state pressed against the pressure plate may be measured to obtain the thickness when pressed by the above specific pressure.

According to the invention, the shape and outer dimensions of the liquid-permeable cushion material are not particularly restricted so long as the effect of the invention is not inhibited, and any shape and outer dimensions may be employed.

For example, the thickness of the cushion material may be any desired thickness in the range of 5 mm to 200 mm.

The method of producing the fiber structure that is to form the liquid-permeable cushion material is not particularly restricted, and the fiber structure may be produced by any publicly known production method. The fiber structure can be produced by discharging a molten thermoplastic resin as filaments from a perforated discharge nozzle having a plurality of orifices, and contacting the discharged filaments together while in a molten state, to form a plurality of filamentous loops and obtain a net-like fiber structure in which they are fused together in a disorderly tangled state, after which the net-like fiber structure is cooled while clamping both sides with a pair of endless net conveyors.

The physical properties of the fiber structure, including the thickness, density, compression property and fiber diameters of the constituent fiber, can be easily adjusted by appropriately setting the production conditions including the discharge hole diameters and throughput (pressure) of the perforated discharge nozzle, the distance between the conveyors of the pair of endless net conveyors, the transport speed and the cooling temperature.

Incidentally, the fiber structure forming the mat described above can be produced in a similar manner.

According to the invention, the liquid-permeable cushion material has a planar area on the top surface that is preferably at least 90% and less than 100% and more preferably at least 95% and less than 100% of the planar area of the top surface of the mat. If the planar area on the top surface of the cushion material is at least 90% and less than 100% of the planar area of the top surface of the mat, the standing sections of the absorbent sheet will be inserted in the narrow gaps between the side surfaces of the cushion material and the inner peripheral wall surfaces of the frame body, helping to maintain the standing state of the standing sections. This will allow the function and effect exhibited by the standing sections of the absorbent sheet to be even more reliably obtained.

Furthermore, according to the invention, preferably the fiber structure forming the liquid-permeable cushion material has ends of the fibers composing the fiber structure (the constituent fibers) present on the side surfaces extending in the thickness direction of the fiber structure, and the ends are engaged with the absorbent sheet.

Figure 5:
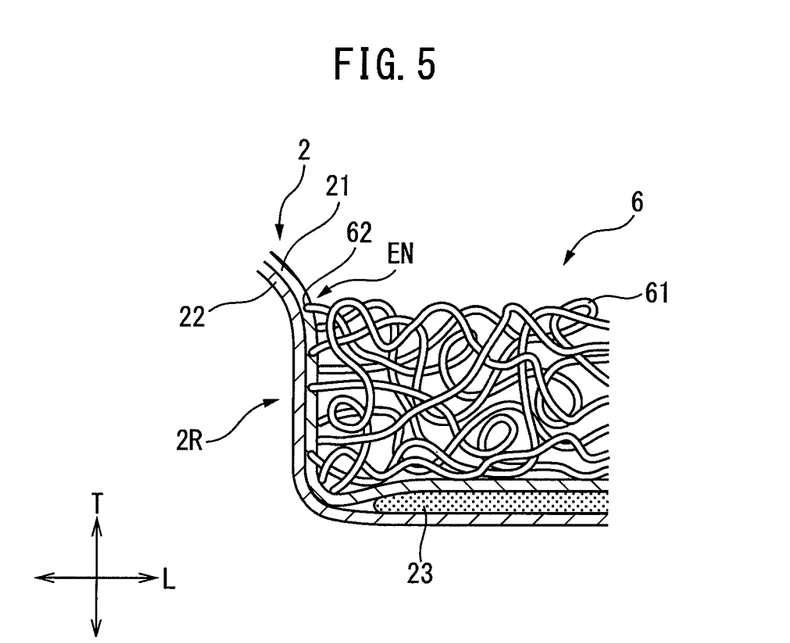
FIG. 5 is a partial magnified view of section V of the pet bed according to an embodiment of the invention in FIG. 2.

FIG. 5 is a partial magnified view of section V of the pet bed 1 according to the embodiment described above, in FIG. 2. As shown in FIG. 5, when ends 62 of the constituent fibers 61 extending on a side surface of the fiber structure forming the cushion material 6 are engaged with the absorbent sheet 2 (specifically, the top sheet 21 of the absorbent sheet 2), the standing section 2R of the absorbent sheet 2 is held by the ends 62 of the constituent fibers 61 of the fiber structure at the engagement section EN, so that the standing state of the standing section 2R is even more easily maintained. This allows the function and effect exhibited by the standing section 2R of the absorbent sheet 2 to be even more reliably obtained.

Incidentally, the fiber structure forming the liquid-permeable cushion material preferably does not have ends of the constituent fibers present on the surfaces other than the side surfaces (i.e., on the top surface and bottom surface). If the fiber structure has such a structure, it will be possible to obtain highly resilient cushioning performance with even more excellent diffusion of body pressure.

According to the invention, for the fiber structure forming the cushion material it is also suitable to use a fiber structure with a two-layer structure having, in the thickness direction, a high-density layer that forms the top surface of the fiber structure and has a relatively high density (apparent density), and a low-density layer that is situated on the bottom side of the high-density layer and has a relatively low density.

If the fiber structure forming the cushion material has, in the thickness direction, a high-density layer with relatively high density and a low-density layer with relatively low density, a fixed space can be ensured between the pet's body and the absorbent sheet by the high-density layer while a fixed cushioning property can be ensured by the low-density layer, that are in the cushion material.

Furthermore, if a fiber structure with such a two-layer structure is used as the cushion material with the high-density layer on the top side, since the high-density layer forming the top surface of the cushion material (fiber structure) has densely disposed constituent fibers that are unlikely to move, the interfiber distances between the constituent fibers on the top surface are unlikely to vary even if the pet moves on the top surface of the cushion material, and liquids of liquid excreta or washing fluid that have been supplied onto the top surface of the cushion material can be caused to stably migrate to the bottom side of the cushion material.

Incidentally, while the liquid-permeable cushion material is not an essential constituent element of the pet bed of the invention as mentioned above, the pet bed preferably comprises a cushion material from the viewpoint of more reliably preventing the aforementioned transmitted leakage.

[Absorbent Sheet]

For the pet bed 1 of this embodiment, as shown in FIGS. 1 to 3, the absorbent sheet 2 is constructed of a sheet-like member with an absorption property, having an essentially rectangular outer shape in the planar view in the expanded state, and it comprises at least a top sheet 21, a back sheet 22 and an absorbent body 23 situated between the two sheets. Since the absorbent sheet 2 is situated on the top surface of the mat 4 of the bed body 5 (i.e., the bottom side Db of the bottom part of the recess 5R serving as the sleeping area of the pet bed 1), even when the pet (especially a bedridden pet in need of nursing) discharges liquid excreta such as urine in the recess 5R or the owner washes the pet with a washing fluid in the recess 5R, it can absorb and retain the liquid of the liquid excreta or washing fluid at the bottom side Db of the bottom part of the recess 5R (the bottom side Db of the cushion material 6, for this embodiment).

Furthermore, for the pet bed of the invention, it is an essential constituent feature that the absorbent sheet situated on the top surface of the mat of the bed body has outer dimensions such that the planar area in the expanded state is larger than the planar area of the top surface of the mat.

If the absorbent sheet has such outer dimensions, then when the absorbent sheet is situated on the top surface of the mat of the bed body, the outer perimeter edges of the absorbent sheet will rise toward the top side along the inner peripheral wall surfaces of the frame body, as shown in FIG. 1, FIG. 2 and FIG. 4, so as to form standing sections that function as anti-leakage walls against the liquid of the liquid excreta or washing fluid. If such standing sections are formed, the liquid will be unlikely to leak from the absorbent sheet (i.e., transmitted leakage will be unlikely to occur) even when it has diffused over the surface of the pet's body or through the surface of the absorbent sheet to the outer side in the in-plane direction of the absorbent sheet.

The absorbent sheet-like member forming the absorbent sheet is not particularly restricted, and any desired sheet-like member may be employed, so long as it comprises at least a top sheet, a back sheet and an absorbent body situated between the two sheets, and has outer dimensions such that the planar area in the expanded state is larger than the planar area of the top surface of the mat. Apart from these outer dimensions, the absorbent sheet for treatment of pet excreta disclosed in Japanese Unexamined Patent Publication No. 2005-198598, for example, may be suitably used.

Moreover, according to the invention, the outer dimensions (size) of the absorbent sheet are not particularly restricted, and any desired outer dimensions may be employed, so long as the planar area in the expanded state is larger than the planar area of the top surface of the mat; however, preferably the absorbent sheet has outer dimensions allowing the outer perimeter edges of the absorbent sheet to extend as extending sections on the top surface of the cushion material when the cushion material is situated on the top surface of the absorbent sheet, as in the embodiment described above.

For the embodiment described above, since the outer perimeter edges of the absorbent sheet 2 have extending sections 2E that extend to the top surface of the cushion material 6 and the standing sections 2R of the absorbent sheet 2 are formed to a high height, as shown in FIG. 2, it is possible to minimize not only the aforementioned transmitted leakage (i.e., transmitted leakage by diffusion on the surface of the pet's body or through the surface of the absorbent sheet 2), but also transmitted leakage by diffusion through the surface on the top side Da of the cushion material 6 or through the constituent fibers. This can more reliably avoid fouling by liquids of liquid excreta or washing fluid.

Furthermore, according to the invention, the absorbent sheet may be suitably used even if the absorbent body has a planar area that is smaller than the planar area on the top surface of the cushion material.

If the absorbent body in the absorbent sheet has a planar area that is smaller than the planar area on the top surface of the cushion material, the standing sections of the absorbent sheet will be formed of a laminate of the top sheet and back sheet. Since the standing sections formed of the laminate do not include the absorbent body and are less likely to vary in thickness even upon absorption of liquid, the standing sections can more stably maintain their standing state in the gaps between the side surfaces of the cushion material and the inner peripheral wall surfaces of the frame body even when the absorbent sheet has absorbed the liquid.

Particularly when the ends of the constituent fibers of the fiber structure forming the cushion material are engaged with the absorbent sheet, the ends of the constituent fibers present on the side surfaces of the cushion material (fiber structure) easily reach to the back sheet through the top sheet at the standing sections of the absorbent sheet, and the ends of the constituent fibers and the absorbent sheet can more firmly engage, thereby allowing the standing sections to more reliably maintain their standing state.

Furthermore, according to the invention, the absorbent sheet may be suitably used even if the absorbent body has a planar area that is larger than the planar area on the top surface of the cushion material.

If the absorbent body in the absorbent sheet has a planar area that is larger than the planar area on the top surface of the cushion material, the standing sections of the absorbent sheet will be formed of a laminate of the top sheet, the absorbent body and the back sheet. The standing sections formed of such a laminate can absorb liquids of liquid excreta or washing fluid, and therefore even when large amounts of liquid have diffused to the outer side in the in-plane direction of the absorbent sheet, they can be absorbed by the standing sections and the aforementioned transmitted leakage can be even more reliably prevented.

[Method of Use]

A method of using a bed body in the pet bed described above will now be explained, as another aspect of the invention.

As mentioned above, the pet bed body is provided with a frame body having a prescribed thickness, and a mat having a smaller thickness than the thickness of the frame body and inserted in a freely detachable manner in the frame body, and the bed body can be used by placing an absorbent sheet having a planar area in the expanded state that is larger than the planar area of the top surface of the mat, on the top surface of the mat.

In this method of using a bed body, an absorbent sheet is placed on the top surface of the mat of the bed body, and therefore even when a bedridden pet discharges liquid excreta such as urine onto the bed or the owner washes the pet with a washing fluid on the bed, during nursing of the pet, the liquid of the liquid excreta or washing fluid can be absorbed and retained in the absorbent sheet that has been disposed on the top surface of the mat. Furthermore, since the absorbent sheet has a planar area in the expanded state that is larger than the planar area of the top surface of the mat, when the absorbent sheet is situated on the top surface of the mat of the bed body, the outer perimeter edges of the absorbent sheet rise toward the top side along the inner peripheral wall surfaces of the frame body, allowing formation of standing sections that function as anti-leakage walls against the aforementioned liquid. If such standing sections are formed, the liquid will be unlikely to leak from the absorbent sheet even when it has diffused through the surface of the pet's body or the surface of the absorbent sheet to the outer side in the in-plane direction of the absorbent sheet.

In this method of using a bed body, therefore, even when a bedridden pet discharges liquid excreta such as urine onto the bed or the owner washes the pet with a washing fluid on the bed, during nursing of the pet, it is possible to avoid fouling of the bed body by liquid of the liquid excreta or washing fluid and to maintain a satisfactory hygienic condition, thereby helping to alleviate the effort needed for washing of the bed body by the owner.

Incidentally, the pet bed and method of using a bed body of the invention are not restricted to the embodiments described above and can incorporate appropriate combinations and modifications within a range that is not outside of the object and gist of the invention. For example, the pet bed may also comprise a washable bed cover that is freely detachable.

REFERENCE SIGNS LIST

1 Pet bed
2 Absorbent sheet
21 Top sheet
22 Back sheet
23 Absorbent body
3 Frame body
31 Frame body portion
31a Core material
31b Covering material
32 Frame body recess
32B Bottom part
4 Mat
5 Bed body
6 Cushion material
61 Constituent fiber
62 End

The invention claimed is:

1. A pet bed provided with a bed body, the pet bed comprising:
    a frame body having a prescribed thickness; and
    a mat having a smaller thickness than the prescribed thickness of the frame body and inserted in a freely detachable manner in the frame body, wherein the pet bed is provided with an absorbent sheet on a top surface of the mat, and
    the absorbent sheet has a planar area in an expanded state that is larger than a planar area of the top surface of the mat, wherein the absorbent sheet is provided with a top sheet, a back sheet, and an absorbent body situated between these sheets; and
    the pet bed is provided with a liquid-permeable cushion material having a thickness of 5 mm or greater on a top surface of the absorbent sheet, and
    the cushion material is made of a fiber structure composed of thermoplastic resin continuous fibers having fiber diameters of 0.01 mm to 3 mm; and
    the fiber structure has ends of the fibers composing the fiber structure present on side surfaces that extend in a thickness direction, and
    the ends are engaged with the absorbent sheet so that the ends enter into an inside of the absorbent sheet and hold a standing section of the absorbent sheet.

2. The pet bed according to claim 1, wherein the fiber structure has a density of 0.01 $g/cm^3$ to 0.10 $g/cm^3$, and a thickness of 3 mm or greater when pressed by a pressure of 3.4 kPa.

3. The pet bed according to claim 1, wherein the cushion material has a planar area on a top surface of at least 90% and less than 100% of the planar area of the top surface of the mat.

4. The pet bed according to claim 1, wherein the fiber structure has, in a thickness direction, a high-density layer that forms a top surface of the fiber structure and has relatively high density, and a low-density layer that is located on a bottom side of the high-density layer and has relatively low density.

5. The pet bed according to claim 1, wherein the absorbent sheet has extending sections that extend to a top surface of the cushion material.

6. The pet according to claim 1, wherein a planar area of the absorbent body is smaller than a planar area on a top surface of the cushion material.

7. The pet according to claim 1, wherein a planar area of the absorbent body is larger than a planar area on a top surface of the cushion material.

8. A method of using a pet bed body provided with a frame body having a prescribed thickness, and a mat having a smaller thickness than the prescribed thickness of the frame body and inserted in a freely detachable manner in the frame body, the method comprising:

placing an absorbent sheet having a planar area in an expanded state that is larger than a planar area of a top surface of the mat, on the top surface of the mat, wherein the absorbent sheet is provided with a top sheet, a back sheet, and an absorbent body situated between these sheets; and the pet bed is provided with a liquid-permeable cushion material having a thickness of 5 mm or greater on a top surface of the absorbent sheet, and the cushion material is made of a fiber structure composed of thermoplastic resin continuous fibers having fiber diameters of 0.01 mm to 3 mm; and the fiber structure has ends of the fibers composing the fiber structure present on side surfaces that extend in a thickness direction, and the ends are engaged with the absorbent sheet so that the ends enter into an inside of the absorbent sheet and hold a standing section of the absorbent sheet.

\* \* \* \* \*